March 5, 1929.   H. E. BENNER   1,704,587
COUNTER MOLDING MACHINE
Filed Feb. 23, 1927   2 Sheets-Sheet 1
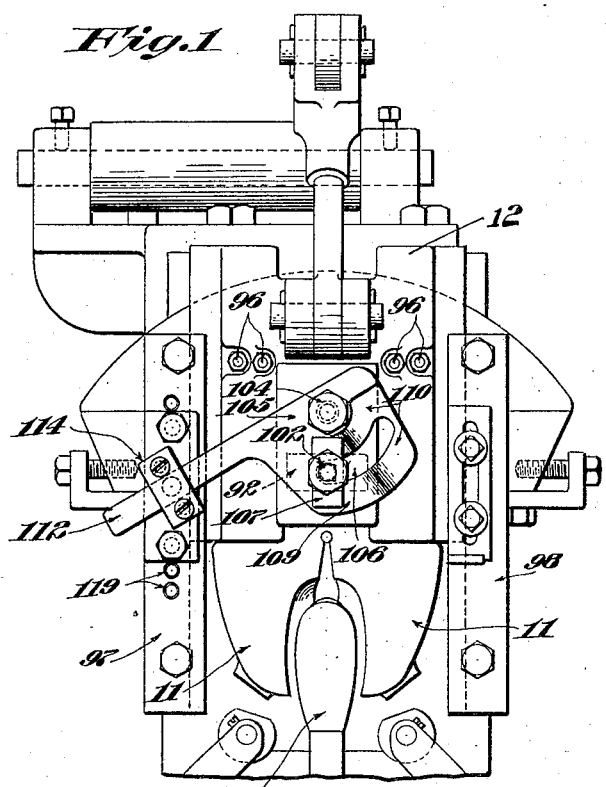
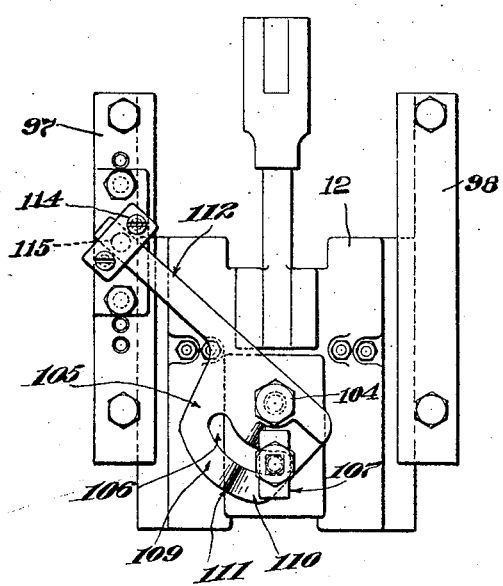
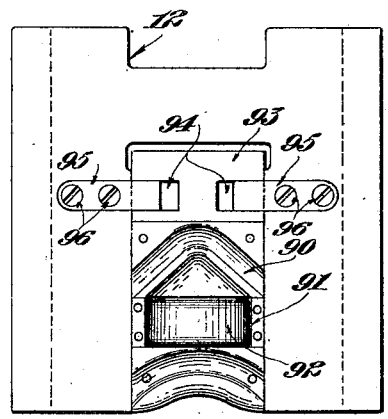
Inventor
Howard E. Benner
by Warren G. Ogden
his Atty.

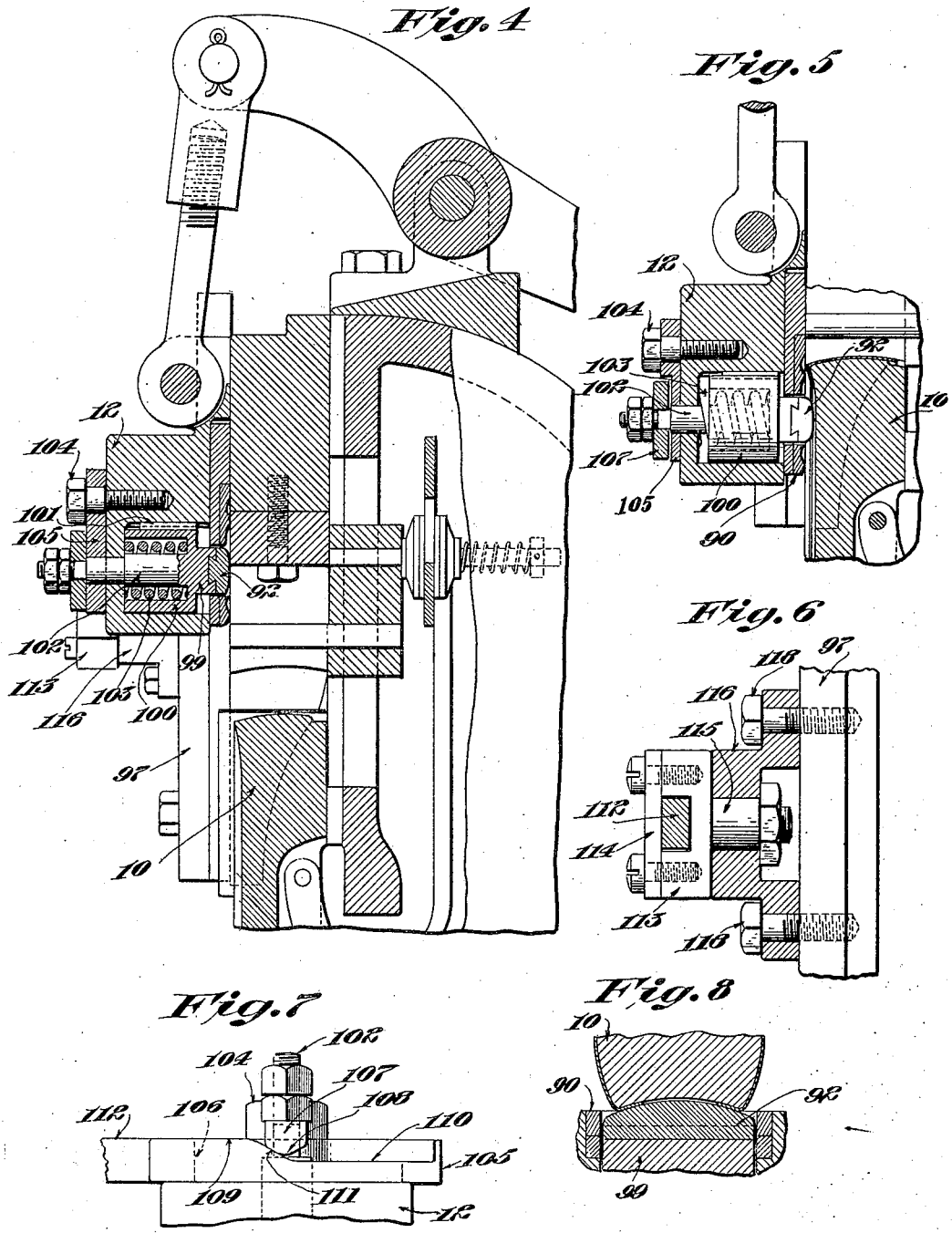

Patented Mar. 5, 1929.

1,704,587

UNITED STATES PATENT OFFICE.

HOWARD E. BENNER, OF NORTH ROCHESTER, NEW HAMPSHIRE, ASSIGNOR TO SPAULDING FIBRE COMPANY, INC., OF NORTH ROCHESTER, NEW HAMPSHIRE, A CORPORATION OF NEW HAMPSHIRE.

COUNTER-MOLDING MACHINE.

Application filed February 23, 1927. Serial No. 170,112.

This invention relates to machines for molding counters for boots and shoes, and more particularly to an improved wiper mechanism for molding the flange of the counter.

The main objective in preparing molded counters is to produce a counter which will perfectly fit the last which is to receive it, thus retaining the lines of the last in the shoe which means perfection of shoemaking. Heretofore in molding counters, it has been the practice to mold the flange portion of the counter to the degree required to cause the flange portion to hug the heel-seat of the last but, owing to the tendency of the flange portion to spring back from the position to which it is molded, when the counter is fitted on the last its flange portion actually is sprung away from the heel-seat of the last. In the type of counter molding machine disclosed in Letters Patent of the United States to Roswell A. Lancey No. 1,138,123, granted May 4, 1915, tempered counter blanks are molded under heat and pressure. This combination of temper, heat and pressure produces an improved molded counter because the springback of the molded heel-seat flange from its molded position is reduced in extent and rendered more uniform. But even this small, uniform spring-back of the heel-seat flange of a counter molded in the Lancey counter molding machine is sufficient to prevent a proper fitting of the counter to the last.

The principal object of the present invention is to produce a machine for molding counters having heel-seat flanges which will hug and fit the heel end of the last when the counter, upper materials and last are assembled.

To the accomplishment of this object a feature of the present invention contemplates the provision in a counter molding machine, having means for forming a heel-seat flange on the counter, of means for molding said flange to the degree that is desired in the molded counter plus an increment commensurate with the spring-back of the flange.

A further object of the present invention is to modify the construction and mode of operation of the counter molding machine disclosed in said Lancey patent in a manner to enable said machine to mold the heel-seat flange to the desired degree plus an increment commensurate with the spring-back of the flange.

To the accomplishment of this object, a further feature of the present invention contemplates the provision in a counter molding machine provided with a center mold having a recessed face and side molds relatively movable to mold the counter portion of a counter, of means for wiping and pressing the flange portion of the counter into engagement with the oblique or sloping margin of the recess in the face of the center mold.

Broadly considered the forward or heelseat face of the center mold may be relieved to receive the flange portion of the counter in any suitable manner found desirable or expedient so long as the recess is designed to increase the molding of the flange portion of the counter by an amount at least equal to the extent which the flange portion of the counter springs out of its molded position. It is preferred to concave the forward face of the center mold and to provide the wiper plate, which crimps and bends the flange portion of the counter inward, with a convex wiping and pressing surface in order that the concave and convex surfaces may cooperate to force the flange into the concavity thus molding the counter flange to a greater degree than is required on the completed counter for fine shoemaking, the additional increment being commensurate with the spring-back of the flange.

While the specific object of the present invention is to produce a machine for molding counters having heel-seat flanges which will hug the heel-seat of the last when the counters are fitted thereon, a further object of the present invention is to improve the construction and operation of counter molding machines generally.

Accordingly, a further feature of the present invention contemplates the provision, in a counter molding machine having side molds and a center mold relatively movable to mold the counter portion of the counter, of means for crimping and wiping the flange portion of the counter into engagement with the forward face of the center mold including a pressure mechanism operating to exert pressure on the flange portion of the counter in a direction substantially normal to the plane of said forward face of the center mold, or across the path of movement of the flange wiper.

In addition to the features of the invention above referred to, other features of the invention consist in certain devices, combinations and arrangements of parts and methods of manufacture fully set forth hereinafter, the advantages of which will be readily understood by those skilled in the art.

The various features of the present invention will be explained in connection with the accompanying drawings illustrating the best form of the invention at present devised, in which:

Figure 1 is a view, in front elevation, of a portion of the counter molding machine of said Lancey patent having the present improvement incorporated therein, with the molds open;

Fig. 2 is a detail, in front elevation, showing the reciprocating carrier, which carries the wiper for wiping the flange portion of the counter into engagement with the center mold, in its lowest position;

Fig. 3 is a detail, in rear elevation, of the reciprocating carrier with the new wiper thereon comprising two relatively movable wiping surfaces;

Fig. 4 is an enlarged detail, in sectional elevation, of the portion of the counter molding machine shown in Fig. 1 showing the counter portion of the counter in position between the open molds;

Fig. 5 is a detail of the parts shown in Figs. 1 and 2, with the exception that it shows the counter in molded position between the molds with the wiper carrier in a position intermediate that of Figs. 1 and 2;

Fig. 6 is a detail, in sectional plan, of the connection between the cover plate and the pivoted yoke which loosely embraces the actuating leg of the cam;

Fig. 7 is an underside plan view, in detail, of the cam and the follower therefor; and Fig. 8 is a detail, in sectional plan, showing the concave and convex surfaces on the opposed faces of the center mold and the pressure plug, respectively.

In the embodiment of the invention illustrated in the drawings, the center mold 10, the two side molds 11, the wiper carrier 12 and the wiper blade or plate 90 are actuated successively to mold the counter portion of the counter and then to wipe its projecting flange portion into engagement with the forward face of the center mold by the mechanism described in detail in said patent to Lancey. In addition the molds may be, and preferably are, heated in the manner fully described in said patent.

In order that the extent to which the flange portion of the counter is molded in the Lancey counter molding machine may be increased and thus produce a counter having a molded heel-seat flange positioned relatively to the molded counter portion such that it will hug the last, the forward face of the center mold 10 is relieved by a concavity best shown by Figs. 4 and 8. This concavity is shaped to receive the flange portion of the counter about its margin. The dimensions of the concavity are such as to impart to the flange portion of the counter a molding increment the amount of which is at least equal to the amount the molded flange springs away from molded position after withdrawal from the molds. The degree of this molding increment is known owing to the uniform product obtainable through the prior practice of the method of molding tempered counter blanks under heat and pressure.

In order to wipe the flange portion of the counter into engagement with the recessed face of the center mold the wiper plate 90 of the Lancey patent is herein provided with a rectangular opening 91 (Fig. 3). Mounted to operate within this opening is a pressure plug 92 which, as shown in Figs. 3 and 8, has a surface convexed across the path of reciprocation of the carrier 12 to conform to the curve of the face of the center mold 10. The leading and following edges of the plug are rounded to facilitate the travel of the plug 92 into and out of the concavity in the face of the center mold (see Fig. 5).

The wiper plate 90 is provided with slots 94 which receive keys 95 secured by screws 96 to the carrier 12. The carrier 12, as in the Lancey patent, slides beneath guide plates 97 and 98 (Fig. 1).

The plug 92 is dovetailed to a boss 99 (Fig. 4) formed on one face of a hollow cylindrical plunger 100 mounted to slide within a housing formed in the carrier 12. The plunger is held from rotation relative to the carrier by a key 101. When inactive the plug 92 occupies the position of Fig. 4. After the center and side molds have been actuated to mold the counter portion of the counter, the carrier 12 is reciprocated from the position of Fig. 4 to the position of Fig. 2 in order to cause the leading edge of the wiper plate 90 to crimp the flange portion of the counter about the forward peripheral edge of the center mold.

In order that the plug 92 may be projected out of the opening 91, from the position of Fig. 4 to that of Fig. 5, during the downward movement of the carrier 12 and thus mold the flange, after having been crimped by the wiper plate 90, down into engagement with the recessed face of the center mold, the plunger 100 is provided with a central spindle 102, passing loosely through the carrier 12, about which a heavy spring 103 is coiled and interposed between the bottom of the plunger and the outer wall of the housing formed in the carrier to receive the plunger.

Normally the spring 103 is held in a compressed condition with the plug 92 housed in the wiper plate opening 91 (see Fig. 4).

The plug 92 is released to the influence of the spring at the proper time during the downward movement of the carrier 12 to exert a heavy pressure on the inturned flange in a direction normal to the face of the center mold, or path of movement of the wiper plate, and thus mold the flange into engagement with the concaved face of the center mold. During the upward movement of the carrier 12 the plug 92 is withdrawn to the position of Fig. 4, the spring 103 is again compressed, and is held in its compressed condition until again released upon the next downward movement of the carrier 12.

To this end the carrier 12 carries a pivot bolt 104 (Figs. 1, 2, 4 and 5) upon which a cam 105 is pivoted. The cam 105 is provided with a curved slot 106 which loosely embraces the spindle 102 near its free end. The spindle 102, on its free end, carries a rectangular cam follower 107 (Figs. 2 and 7) having a V-shaped bottom 108 straddling the slot 106 and engaging the cam 105. The cam 105 is provided with a high surface 109 (Fig. 7) and a low surface 110 connected by an inclined surface 111.

When the follower 107 is upon the high surface 109 the plug 92 is retracted and the spring 103 is held compressed. When the follower 107 rides down the incline 111 and across the low surface 110 the plug 92 is released to the influence of the spring 103 which projects the plug 92 into the position of Fig. 5. When the follower 107 rides up the incline 111 on its return to the high surface 109 the plug 92 is retracted and the spring is recompressed. The parts are so proportioned that the follower merely travels over and does not engage the low surface of the cam, thus causing the heel-seat flange to receive the full force of the heavy spring.

In order to actuate the cam 105 to transfer the follower 107 from the high surface 109 to the low surface 110 during the downward movement of the carrier 12 and to transfer the follower 107 from the low surface 110 to the high surface 109 during the upward movement of the carrier 12, the cam 105 is provided with an actuator leg 112 which is loosely held by a cover plate 114 between the arms of a yoke 113 (Figs. 2 and 3). The yoke 113 is provided with a cylindrical boss 115 secured to a bracket 116, the construction being such that the yoke 113 is free to turn on the bracket. The bracket 116 is secured to the guide plate 97 by a pair of bolts 118 passing through the bracket and block and arranged to engage two of a series of screw-threaded openings 119 formed in the guide plate. The bracket 116 is adjusted vertically to accommodate the timing of the release of the plug 92 to the influence of its spring 103 to suit variations in the construction of mold blocks used in the machine. It is obvious that the travel of the cam follower 107 should be such that the release of the plug to the influence of the spring 103 occurs just as the travel of the wiper plate brings the plug opposite the inwardly crimped heel-seat flange at the upper end of the center mold 10. The vertical location of this point varies with different mold blocks.

From an inspection of Figs. 1 and 2 it will be apparent that with the construction described the fixed yoke 116 will act on the actuator leg 112 to swing the cam 105 in a clockwise direction during the downward movement of the carrier 12 causing a transfer of the follower 107 from the high cam surface 109 to the low cam surface 110. This, as heretofore described, releases the wiping and pressing plug 92 to the influence of the spring 103. The plug 92 will then under the heavy pressure of the spring wipe the flange, previously crimped and molded over the peripheral edge of the center mold by the leading edge of the wiper plate 90, down and into engagement with the marginal surface of the concaved face of the center mold (see Figs. 5 and 8). On the succeeding upward movement of the carrier 12 the cam 105 will be swung by its leg 112 in a contra-clockwise direction to transfer the follower from the low surface 110 to the high surface 109 of the cam and thus retract the plug 92 to its inactive position and at the same time recompress the spring 103.

In the machine herein described the cam which actuates the carrier 12, and which corresponds to the "cam disk 105" in the Lancey patent, may be designed to impart four complete passes of the wiping mechanism across the recessed face of the center mold in each cycle. That is, the wiping mechanism may move downwardly twice and upwardly twice while the center and side molds hold the counter in molded position.

From an inspection of Fig. 5 it will be apparent that the active faces of the wiping plate 90 and the wiping and pressing plug 92 operate in planes substantially on opposite sides of the plane of the peripheral edge of the concaved face of the center mold. The plane in which the wiping plate 90 operates is distant from the plane of the peripheral edge of the concaved face of the center mold by the thickness of the material of the counter, while the plane in which any point on the wiping plug 92 operates is within the plane of the peripheral edge of the concaved face of the center mold.

As a result of the operations hereinbefore described the molding machine forms a counter having the wiped and molded portions of its heel-seat flange, at both sides and at the heel end, all lying in the same plane, thus producing a uniform product having its molded counter portion and its molded flange portion so positioned and related to each other that a perfect fit on the heel end of the last is obtained and the bug-bear of poor shoemaking due to a bulging counter is eliminated. Whether or not the entire flange is to lie in the plane of the heel-seat is determined by adjustment of the actuating mechanism of the wiper plate 90, whereby its path of travel may be altered to vary the lower limit thereof. This adjustment is made in accordance with the demands of shoe manufacturers.

It will be clear to those skilled in this class of machines and with the general objects of the present invention in view, that changes may be made in the details of structure, the described and illustrated embodiment of the invention being intended as an exploitation of its underlying essentials, the features whereof are definitely stated in their true scope in the claims herewith.

That which is claimed as new, is:

1. A counter molding machine having, in combination, means for molding the counter portion of a counter, and means for molding the flange portion of the counter to the desired degree plus an increment commensurate with the spring-back of the flange.

2. A counter molding machine having, in combination, a center mold having a recessed face and side molds relatively movable to mold the counter portion of a counter, and means for wiping and pressing the flange portion of the counter into the recessed face of the center mold.

3. A counter molding machine having, in combination, a center mold having a concaved face and side molds relatively movable to mold the counter portion of a counter, and means for wiping the flange portion of the counter into engagement with the inwardly sloping margin of the concaved face of the center mold.

4. A counter molding machine having, in combination, a center mold and side molds relatively movable to mold the counter portion of the counter, and means movable across the forward face of the center mold for wiping the flange portion of the counter into engagement therewith, said means including a pressure mechanism operating to exert pressure on the flange portion of the counter in a direction substantially normal to the plane of the path of travel of said wiping means.

5. A counter molding machine having, in combination, a center mold and side molds relatively movable to mold the counter portion of the counter, and a device for crimping and pressing the flange portion of the counter against the face of the center mold, said device having a plurality of wiping elements mounted to approach and engage the flange portion of the counter from different directions.

6. A counter molding machine having, in combination, a center mold having a recessed face and side molds relatively movable to mold the counter portion of a counter, and a wiper for bending and wiping the flange portion of the counter into the recess in the face of the center mold, said wiper having an element mounted to operate on one side of the plane of the peripheral edge of the center mold and having another element mounted to operate on the other side of said plane.

7. A counter molding machine having, in combination, a center mold having a recessed face and side molds relatively movable to mold the counter portion of a counter, and a wiper for bending and wiping the flange portion of the counter into the recess in the face of the center mold, said wiper having a surface mounted and guided for movement past said mold face in a plane spaced from the plane of its peripheral edge a distance substantially equal to the thickness of the material of the counter and having another surface mounted to operate within said recess.

8. A counter molding machine having, in combination, a center mold having a concaved face and said molds relatively movable to mold the counter portion of the counter, and a wiper having a convexed surface for wiping the flange portion of the counter into engagement with the concaved face of the center mold.

9. A counter molding machine having, in combination, a center mold having a concaved face and side molds relatively movable to mold the counter portion of the counter, and a reciprocatory wiper for wiping the flange portion of the counter into engagement with the concaved face of the center mold, said wiper having a surface convexed across its line of reciprocatory movement.

10. A counter molding machine having, in combination, a center mold having a concaved face and side molds relatively movable to mold the counter portion of the counter, and a reciprocatory wiper for wiping the flange portion of the counter into engagement with the concaved face of the center mold, said wiper having a surface rounded about its leading and following edges.

11. A counter molding machine having, in combination, a center mold and side molds relatively movable to mold the counter portion of a counter, and a wiper formed of two relatively movable portions both of which engage the flange portion of the counter for crimping and pressing it into molded position against the forward face of the center mold.

12. A counter molding machine having, in combination, a center mold and side molds relatively movable to mold the counter portion of a counter, and a reciprocatory wiper for engaging the flange portion of the counter to form it over the peripheral edge of the center mold provided with an auxiliary flange forming member mounted to move in a direction normal to the reciprocatory movement of the wiper into engagement with the inturned flange previously formed by said wiper.

13. A counter molding machine having, in combination, a center mold and side molds relatively movable to mold the counter portion of a counter, a reciprocatory wiper for engaging the flange portion of the counter to crimp and bend a flange about the peripheral edge of the center mold provided with an auxiliary flange engaging presser, and mechanism for moving said presser in a direction normal to the reciprocatory movement of the wiper and subjecting the crimped and bent flange portion of the counter to a heavy molding pressure.

14. A counter molding machine having, in combination, a center mold and side molds relatively movable to mold the counter portion of a counter, a reciprocatory wiper for crimping and bending the flange portion of the counter about the peripheral edge of the center mold provided with an auxiliary presser yieldingly movable in a direction normal to the reciprocatory movement of the wiper, and a cam for controlling the operation of said auxiliary presser.

15. A counter molding machine having, in combination, a center mold and side molds relatively movable to mold the counter portion of a counter, a reciprocatory wiper for crimping and bending the flange portion of the counter about the peripheral edge of the center mold, a member operable to exert direct pressure on the inturned flange, and means for controlling the operation of said direct pressure member from the movement of said wiper.

16. A counter molding machine having, in combination, a center mold having a recessed face and side molds relatively movable to mold the counter portion of a counter, a wiper having relatively movable portions for crimping and wiping the flange portion of the counter and for direct pressure on said flange portion to mold it into the recessed face of the center mold, a spring for moving the direct pressure portion in one direction, and a cam for moving it in the other direction.

17. A counter molding machine having, in combination, a center mold having a recessed face and side molds relatively movable to mold the counter portion of a counter, and means for crimping and bending the flange portion of the counter about the peripheral edge of the center mold comprising a wiper plate provided with an opening and a plug yieldingly mounted within the opening.

18. A counter molding machine having, in combination, a center mold having a recessed face and side molds relatively movable to mold the counter portion of a counter, a carrier movable past said molds, means for crimping and bending the flange portion of the counter about the peripheral edge of the center mold comprising a wiper plate mounted on the carrier and provided with an opening, a plunger mounted on the carrier, a plug carried by the plunger and received within the opening in the plate, and means for moving the plunger in the carrier to advance the plug out of said opening and into the recess in the center mold comprising a spring interposed between the plug and the carrier.

19. A counter molding machine having, in combination, a center mold having a recessed face and side molds relatively movable to mold the counter portion of a counter, a carrier movable past said molds, means for crimping and bending the flange portion of the counter about the peripheral edge of the center mold comprising a wiper plate mounted on the carrier and provided with an opening, a plunger mounted on the carrier, a plug carried by the plunger and received within the opening in the plate, a spring for moving the plunger in the carrier to advance the plug out of said opening interposed between the plug and the carrier, and mechanism for storing power in the spring and holding the plug in a retracted position.

20. A counter molding machine having, in combination, a center mold having a recessed face and side molds relatively movable to mold the counter portion of a counter, a carrier movable past said molds, means for crimping and bending the flange portion of the counter about the peripheral edge of the center mold comprising a wiper plate mounted on the carrier and provided with an opening, a plunger mounted on the carrier, a plug carried by the plunger and received within the opening in the plate, a spring for moving the plunger in the carrier to advance the plug out of said opening interposed between the plug and the carrier, a cam, a follower, and connections between the follower and the plunger for storing power in the spring and holding the plug in a retracted position.

21. A counter molding machine having, in combination, means for molding the counter portion of a counter including a center mold having a recessed face, and means acting successively upon the flange portion of the counter for crimping and bending it about the peripheral edge of said center mold and for forcing said crimped and bent flange into the recess in the face of said center mold.

22. A counter molding machine having, in combination, means for molding the counter portion of a counter including a center mold having a recessed face, a wiper plate movable across the recessed face of said center mold, an auxiliary presser carried by said wiper plate and movable in a direction to carry it into the recess of said center mold, means for holding said presser from movement during the travel of said wiper plate until said presser reaches said center mold and for then releasing it, and means for exerting pressure on said presser during the remainder of the travel of said wiper plate.

23. A counter molding machine having, in combination, means for molding the counter portion of a counter including a center mold having a recessed face, a wiper plate movable across the recessed face of said center mold, an auxiliary presser carried by said wiper plate, a spring for forcing said presser into the recess of said center mold, a device for tensioning said spring and holding said presser inactive, and means operating at a predetermined point in the travel of said wiper plate for operating said device to release said presser to the control of said spring.

24. A counter molding machine having, in combination, means for molding the counter portion of a counter including a center mold having a recessed face, a wiper plate movable across the recessed face of said center mold having an opening, a plunger having a presser mounted within said opening, a spring for moving the presser in a direction to force it out of said opening, a device for storing power in the spring and for holding the presser inactive comprising a rotary cam mounted for movement with the wiper plate and a cam follower carried by the plunger, and said cam having a leg engaged with a yoke pivotally mounted on a fixed part of the machine, whereby when the wiper moves across said center mold the cam is rotated in a direction to release the presser and place it under control of said spring.

25. A counter molding machine having, in combination, means for molding the counter portion of a counter including a center mold having a recessed face, a wiper plate movable across the recessed face of said center mold having an opening, a plunger having a presser mounted within said opening, a spring for moving the presser in a direction to force it out of said opening, a device for storing power in the spring and for holding the presser inactive comprising a rotary cam mounted for movement with the wiper plate and a cam follower carried by the plunger, said cam having a leg engaged with a yoke pivotally mounted on a fixed part of the machine, whereby when the wiper moves across said center mold the cam is rotated in a direction to release the presser and place it under control of said spring, and means permitting adjustment of said yoke in the direction of the path of travel of said wiper plate to vary the timing of said release as said wiper plate advances.

26. That improvement in the art of molding counters which comprises subjecting a counter blank to pressure to mold the counter portion of the counter, and then molding the flange portion of the counter to the desired degree plus an increment which is at least equal to the amount that it springs out of molded position after release of the molding pressure.

27. That improvement in the art of molding counters which comprises tempering a counter blank, subjecting the tempered blank to pressure to mold the counter portion of the counter, crimping and molding the flange portion of the counter, and pressing said flange inward by an additional increment the amount of which is commensurate with the amount that it springs out of molded position after release of the molding pressure.

HOWARD E. BENNER.